United States Patent
Voigt (10) Patent No.: US 10,408,712 B2
(45) Date of Patent: Sep. 10, 2019

(54) SYSTEM AND METHOD FOR ENERGY ANALYSIS AND PREDICTIVE MODELING OF COMPONENTS OF A COOLING SYSTEM

(71) Applicant: Liebert Corporation, Columbus, OH (US)

(72) Inventor: Tyler Voigt, Dublin, OH (US)

(73) Assignee: Vertiv Corporation, Columbus, OH (US)

(*) Notice: Subject to any disclaimer, the term of this patent is extended or adjusted under 35 U.S.C. 154(b) by 1295 days.

(21) Appl. No.: 14/204,677

(22) Filed: Mar. 11, 2014

(65) Prior Publication Data

US 2014/0278245 A1 Sep. 18, 2014

Related U.S. Application Data

(60) Provisional application No. 61/793,872, filed on Mar. 15, 2013.

(51) Int. Cl.
*F24F 11/46* (2018.01)
*F24F 11/83* (2018.01)
(Continued)

(52) U.S. Cl.
CPC .......... *G01M 99/005* (2013.01); *F24F 11/83* (2018.01); *F24F 11/46* (2018.01); *F24F 11/85* (2018.01);
(Continued)

(58) Field of Classification Search
CPC ........ F25B 49/02; F25B 1/053; F25B 49/022; F24F 11/0086; F24F 5/0035; G06F 1/206;
(Continued)

(56) References Cited

U.S. PATENT DOCUMENTS 3,625,020 A 12/1971 Kimpel et al.
4,282,718 A 8/1981 Kountz et al.
(Continued)

FOREIGN PATENT DOCUMENTS

CN 201262697 Y 6/2009
KR 2010046105 5/2010
(Continued)

OTHER PUBLICATIONS

Chinese Office Action and Search Report for corresponding Chinese Patent Application 201410098126.7 dated Aug. 15, 2016, 12 pages.
(Continued)

*Primary Examiner* — Regis J Betsch
*Assistant Examiner* — Kaleria Knox
(74) *Attorney, Agent, or Firm* — Harness, Dickey & Pierce, P.L.C.

(57) ABSTRACT

A method is disclosed for analyzing performance of a chilled water (CW) system having a plurality of CW components. The method may consider a collection of at least one of allowable operating points, allowable operating ranges or allowable operating conditions, for each one of the CW components. A user set or system measured ambient wet bulb (WB) temperature may be considered for an environment in which at least a subplurality of the CW components are located. Equivalent loop conditions may be calculated for each of the CW components covering a load being thermally managed by the CW system. For each one of the calculated equivalent loop conditions, a processor may generate information for balancing the CW components to meet load requirements, and then analyze and select a balance condition that yields the user preferable optimization.

16 Claims, 8 Drawing Sheets

(51) Int. Cl.
*F24F 11/85* (2018.01)
*F28F 27/00* (2006.01)
*G01M 99/00* (2011.01)

(52) U.S. Cl.
CPC ......... *F28F 27/003* (2013.01); *F28F 2200/00* (2013.01)

(58) Field of Classification Search
CPC ... G06F 1/2062; G01R 22/068; G01R 31/086; H02J 13/0006; Y04S 10/522
USPC ................ 62/177; 700/300, 278; 422/187
See application file for complete search history.

(56) References Cited

U.S. PATENT DOCUMENTS

| | | |
|---|---|---|
| 4,287,939 A | 9/1981 | Pohl et al. |
| 4,327,559 A | 5/1982 | Spethmann |
| 4,387,368 A | 6/1983 | Day, III et al. |
| 4,546,618 A | 10/1985 | Kountz et al. |
| 4,715,190 A | 12/1987 | Han et al. |
| 5,040,377 A | 8/1991 | Braun et al. |
| 5,195,329 A * | 3/1993 | Lewis ................ F25B 49/022 236/1 EA |
| 5,279,458 A | 1/1994 | DeWolf et al. |
| 5,355,691 A | 10/1994 | Sullivan et al. |
| 5,553,997 A | 9/1996 | Goshaw et al. |
| 5,600,960 A | 2/1997 | Schwedler et al. |
| 5,669,225 A | 9/1997 | Beaverson et al. |
| 6,085,532 A * | 7/2000 | Sibik ....................... F25B 49/02 62/177 |
| 6,185,946 B1 | 2/2001 | Hartman |
| 6,202,431 B1 | 3/2001 | Beaverson et al. |
| 6,257,007 B1 | 7/2001 | Hartman |
| 6,427,464 B1 | 8/2002 | Beaverson et al. |
| 6,679,076 B1 | 1/2004 | Duga et al. |
| 6,691,525 B2 | 2/2004 | Beaverson et al. |
| 6,786,056 B2 | 9/2004 | Bash et al. |
| 6,817,199 B2 | 11/2004 | Patel et al. |
| 6,826,922 B2 | 12/2004 | Patel et al. |
| 6,854,287 B2 | 2/2005 | Patel et al. |
| 6,886,353 B2 | 5/2005 | Patel et al. |
| 6,938,433 B2 | 9/2005 | Bash et al. |
| 6,955,302 B2 | 10/2005 | Erdman, Jr. |
| 7,225,054 B2 | 5/2007 | Amundson et al. |
| 7,315,448 B1 | 1/2008 | Bash et al. |
| 7,365,973 B2 | 4/2008 | Rasmussen et al. |
| 7,596,476 B2 | 9/2009 | Rasmussen et al. |
| 7,757,506 B2 | 7/2010 | Ellsworth, Jr. et al. |
| 7,788,941 B2 | 9/2010 | Campbell et al. |
| 7,791,882 B2 | 9/2010 | Chu et al. |
| 7,801,646 B2 | 9/2010 | Amundson et al. |
| 7,808,780 B2 | 10/2010 | Brunschwiler et al. |
| 7,832,925 B2 | 11/2010 | Archibald et al. |
| 7,870,090 B2 | 1/2011 | McCoy et al. |
| 7,881,910 B2 | 2/2011 | Rasmussen et al. |
| 7,885,795 B2 | 2/2011 | Rasmussen et al. |
| 7,894,943 B2 | 2/2011 | Sloup et al. |
| 7,895,855 B2 | 3/2011 | Gooch |
| 7,904,186 B2 | 3/2011 | Mairs et al. |
| 7,905,096 B1 | 3/2011 | Campbell et al. |
| 7,917,232 B2 | 3/2011 | McCoy et al. |
| 7,963,119 B2 | 6/2011 | Campbell et al. |
| 8,004,832 B2 | 8/2011 | Brunschwiler et al. |
| 8,024,054 B2 | 9/2011 | Mairs et al. |
| 8,031,468 B2 | 10/2011 | Bean, Jr. et al. |
| 8,050,801 B2 | 11/2011 | Richards et al. |
| 8,055,386 B2 | 11/2011 | McCoy et al. |
| 8,055,387 B2 | 11/2011 | McCoy et al. |
| 8,078,326 B2 | 12/2011 | Harrod et al. |
| 8,099,178 B2 | 1/2012 | Mairs et al. |
| 8,107,234 B2 | 1/2012 | Brunschwiler et al. |
| 8,144,467 B2 | 3/2012 | Campbell et al. |
| 8,145,363 B2 | 3/2012 | Bean, Jr. et al. |
| 8,184,436 B2 | 5/2012 | Campbell et al. |
| 8,219,249 B2 | 7/2012 | Harrod et al. |
| 8,223,495 B1 | 7/2012 | Carlson et al. |
| 2002/0172629 A1* | 11/2002 | Jahn ..................... B01J 19/0046 422/187 |
| 2004/0020225 A1 | 2/2004 | Patel et al. |
| 2007/0055756 A1 | 3/2007 | Richards et al. |
| 2007/0167125 A1 | 7/2007 | Rasmussen et al. |
| 2008/0041076 A1 | 2/2008 | Tutunoglu et al. |
| 2008/0041077 A1 | 2/2008 | Tutunoglu |
| 2008/0160902 A1 | 7/2008 | Desler |
| 2008/0198549 A1 | 8/2008 | Rasmussen et al. |
| 2008/0245083 A1 | 10/2008 | Tutunoglu et al. |
| 2009/0012651 A1 | 1/2009 | Lifson et al. |
| 2009/0030554 A1 | 1/2009 | Bean, Jr. et al. |
| 2009/0171512 A1* | 7/2009 | Duncan ................ F24F 5/0035 700/300 |
| 2009/0259343 A1 | 10/2009 | Rasmussen et al. |
| 2010/0023171 A1 | 1/2010 | Bittner et al. |
| 2010/0041327 A1 | 2/2010 | Desler |
| 2010/0057263 A1 | 3/2010 | Tutunoglu |
| 2010/0070085 A1 | 3/2010 | Harrod et al. |
| 2010/0070089 A1 | 3/2010 | Harrod et al. |
| 2010/0070093 A1* | 3/2010 | Harrod ................. F24F 11/0086 700/278 |
| 2010/0070907 A1 | 3/2010 | Harrod et al. |
| 2010/0211669 A1 | 8/2010 | Dalgas et al. |
| 2010/0263855 A1 | 10/2010 | Arimilli et al. |
| 2010/0324962 A1 | 12/2010 | Nesler et al. |
| 2011/0010151 A1 | 1/2011 | Archibald et al. |
| 2011/0023515 A1 | 2/2011 | Kopko et al. |
| 2011/0047418 A1 | 2/2011 | Drees et al. |
| 2011/0060470 A1 | 3/2011 | Campbell et al. |
| 2011/0061015 A1 | 3/2011 | Drees et al. |
| 2011/0075373 A1 | 3/2011 | Campbell et al. |
| 2011/0077795 A1* | 3/2011 | VanGilder ............. G06F 1/206 700/300 |
| 2011/0093133 A1* | 4/2011 | Turney .................... F25B 1/053 700/300 |
| 2011/0130886 A1 | 6/2011 | Drees et al. |
| 2011/0146965 A1 | 6/2011 | Gloeckner et al. |
| 2011/0154842 A1 | 6/2011 | Heydari et al. |
| 2011/0178977 A1 | 7/2011 | Drees |
| 2011/0197612 A1 | 8/2011 | Campbell et al. |
| 2011/0215645 A1 | 9/2011 | Schomburg et al. |
| 2011/0225997 A1 | 9/2011 | Gast, Jr. et al. |
| 2011/0232889 A1 | 9/2011 | Eckberg et al. |
| 2011/0246147 A1 | 10/2011 | Rasmussen et al. |
| 2011/0256822 A1 | 10/2011 | Carlson |
| 2011/0257911 A1 | 10/2011 | Drees et al. |
| 2011/0265982 A1 | 11/2011 | Jansen et al. |
| 2011/0283718 A1 | 11/2011 | Ueda |
| 2011/0307820 A1 | 12/2011 | Rasmussen et al. |
| 2012/0012283 A1 | 1/2012 | Bean, Jr. et al. |
| 2012/0022700 A1 | 1/2012 | Drees et al. |
| 2012/0055184 A1 | 3/2012 | Ueda |
| 2012/0084063 A1 | 4/2012 | Drees et al. |
| 2012/0103591 A1 | 5/2012 | Tozer |
| 2012/0109383 A1 | 5/2012 | Richards et al. |
| 2012/0118534 A1 | 5/2012 | Goth et al. |
| 2012/0120603 A1 | 5/2012 | Campbell et al. |
| 2012/0123607 A1 | 5/2012 | Canney et al. |
| 2012/0147552 A1 | 6/2012 | Driggers |
| 2012/0174609 A1 | 7/2012 | Matsuo et al. |

FOREIGN PATENT DOCUMENTS

| | | |
|---|---|---|
| WO | 2011091380 A1 | 7/2011 |
| WO | 2012011813 A2 | 1/2012 |
| WO | 2012094806 A1 | 7/2012 |

OTHER PUBLICATIONS

Maier, Robert S. "Preparing for Cray XE6 Integration," DOD HPC Insights, Spring 2013, pp. 34-36.

Thornhill, Rob. "Facility Upgrades in Support of the IBM iDataPlex Systems," DOD HPC Insights, Spring 2013, p. 42.

(56) References Cited

OTHER PUBLICATIONS

The Hartman Loop. "All-Variable Speed Chiller Plant Design and Operating Technologies, Frequently Asked Questions," The Hartman Company, Sep. 7, 2001, 16 pages.

\* cited by examiner

SYSTEM AND METHOD FOR ENERGY ANALYSIS AND PREDICTIVE MODELING OF COMPONENTS OF A COOLING SYSTEM

CROSS REFERENCE TO RELATED APPLICATIONS

The present application claims priority from U.S. Provision Patent Application Ser. No. 61/793,872, filed Mar. 15, 2013, the entire disclosure of which is incorporated by reference herein.

FIELD

The present disclosure relates to systems for analyzing performance of a cooling system, and more particularly to a comprehensive system and method for analyzing and modeling a plurality of diverse components of a cooling system for the purpose of determining and/or predicting the cooling capability of the system in response to a plurality of device operational parameters and user defined inputs.

BACKGROUND

The statements in this section merely provide background information related to the present disclosure and may not constitute prior art.

Improving performance of cooling systems and controlling such cooling systems is rapidly gaining attention as the cooling needs for various facilities, in particular data centers, continue to grow in size. In particular, with a chilled water ("CW") cooling system, a number of components operate to remove heat from a load, where the load may be created by a wide variety of different types of devices. In one example the load may be heat which is generated within data centers by dozens, hundreds or thousands of servers and other IT and/or network equipment. The basic CW cooling system may be understood, in one example, as including one or more chillers, one or more CW pumps, a bypass, one or more cooling tower pumps, one or more cooling towers, makeup water filtration controls, one or more variable frequency drives (VFDs) with controls, and associated piping connecting the aforementioned components. The performance and/or equipment set points associated with any one or more of these devices can have a bearing on the performance output of individual components and respectively the entire CW system during transition and balance. Presently there is no known system which is able to use the known information, performance abilities or performance curves of various ones of the components of a CW system to model how various important performance parameters of the CW system, such as total gallons per minute (GPM), temperature differential ($\Delta T$) and SCWT (Supply Chilled Water Temperature) are likely to be affected if varying equipment set points are applied to one or more of the components of the CW system. Moreover, there is no way to be able to predict how a performance change (or user/system changed set point) for one specific component may affect operation of one or more of the other components of the system that may be receiving the direct or indirect output from the specific component.

SUMMARY

In one aspect the present disclosure relates to a method for analyzing performance of a chilled water ("CW") system having a plurality of CW components. The method may comprise considering a collection of at least one of allowable operating points, allowable operating ranges or allowable operating conditions, for each one of the plurality of CW components of the CW system. The method may further comprise considering a user set or system measured ambient wet bulb (WB) temperature for an environment in which at least a subplurality of the CW components are located. Equivalent loop conditions may be calculated for each of the CW components which together cover a load being thermally managed by the CW system. The equivalent loop conditions may relate to a performance parameter for one or more of the CW components covering the load in a manner to manage cooling of the load. For each one of the calculated equivalent loop conditions, a processor may be used to generate information for balancing the CW components by selecting specific operating points of the CW system, given the user set or system measured WB temperature, to meet load requirements imposed by the load.

In another aspect the present disclosure relates to a method for analyzing and optimizing performance of a chilled water (CW) system having a plurality of CW components. The method may comprise obtaining a performance data table for each one of the CW components of the CW system. The performance data table may define at least one of operating points or operating ranges for each of the CW components based on at least one of an input or an output associated with each of the CW components. A user set or system measured ambient wet bulb (WB) temperature may be obtained for an environment in which at least a subplurality of the CW components are located. A collection of at least one of allowable operating points, operating ranges or allowable operating conditions may be obtained, for each one of the subplurality of components of the CW system, based on information provided by the user or representing a known operating parameter limitation. Equivalent loop conditions may be calculated for each of the CW components covering a load being thermally managed by the CW system. The equivalent loop conditions may relate to at least one of gallons per minute (GPM), a change in temperature, and a supply chilled water temperature (SCWT) for one or more of the CW components covering the load in a manner to manage cooling of the load. For each one of the calculated equivalent loop conditions, a processor may be used to balance the CW components of the CW system, given the user set or system measured WB temperature, to meet load requirements, to thus generate a plurality of calculated results which may or may not include one or several set points for each controllable CW component that yields a system balance at the WB temperature and load. The plurality of results may be used to optimize operation of the CW components by selecting specific set points for the CW components that result in optimizing a selected operational parameter for the CW system.

In still another aspect the present disclosure relates to a system method for analyzing performance of a chilled water (CW) system having a plurality of CW components. The system may comprise at least one processor having nontransitory, machine executable code configured to make use of a performance data table for each one of the CW components of the CW system. The performance data table may define at least one of operating points or operating ranges for each of the CW components based on at least one of an input or an output associated with each of the CW components. The at least one processor may also make use of a user set or system measured ambient wet bulb (WB) temperature for an environment in which at least a subplurality of the CW components are located. Still further the processor may make use of a collection of at least one of allowable operating points, operating ranges or allowable operating conditions, for each one of the subplurality of components of the CW system. The processor may calculate equivalent loop conditions for each of the CW components covering a load being thermally managed by the CW system. The equivalent loop conditions may relate to a performance parameter for one or more of the CW components covering the load in a manner to manage cooling of the load. For each one of the calculated equivalent loop conditions, the processor may generate information for balancing the CW components of the CW system, given the user set or system measured WB temperature, to meet load requirements imposed by the load.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
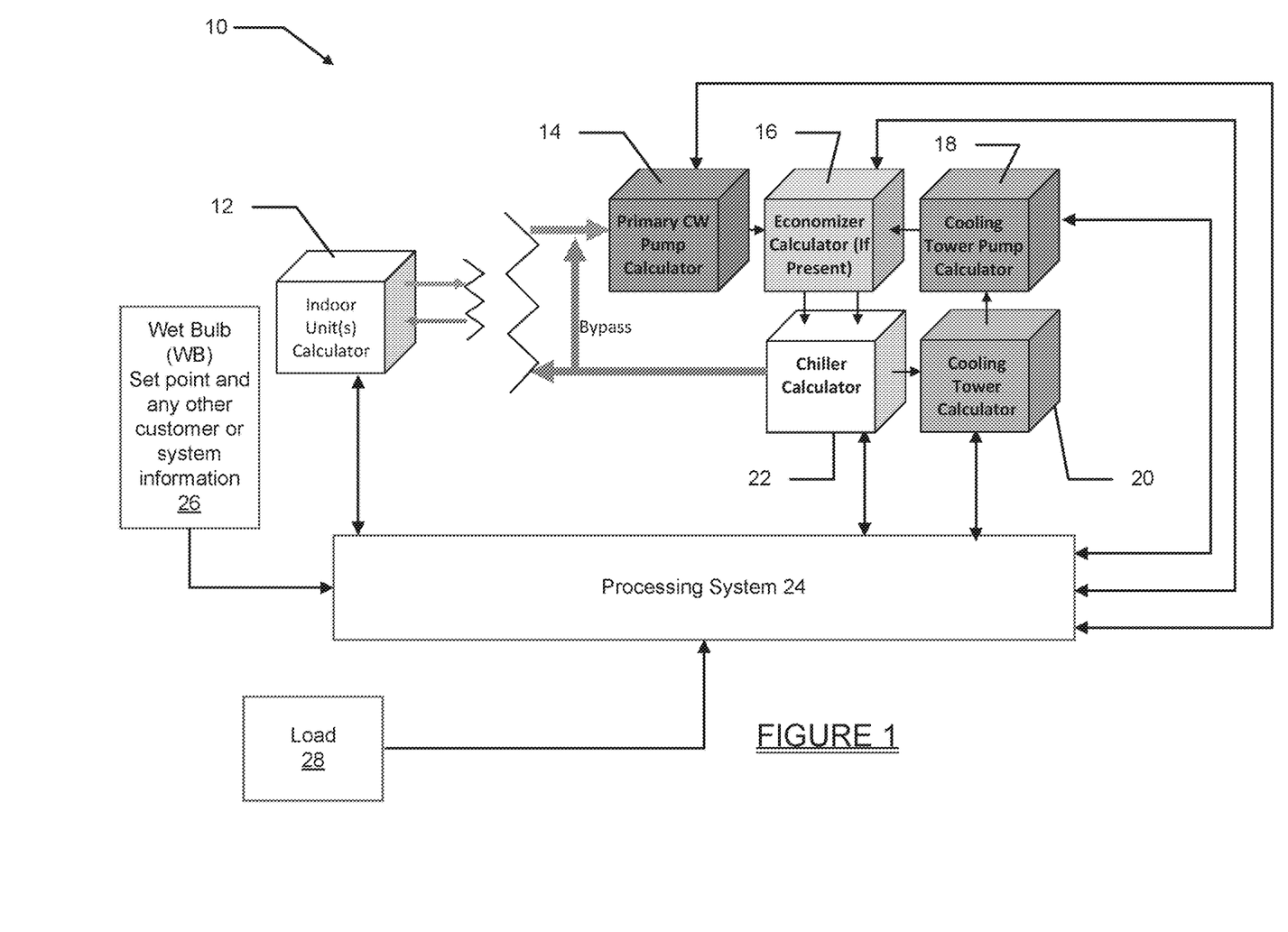
FIG. 1 is a block diagram of various subportions of the system that may be used to calculate performance characteristics of both the indoor operating conditions and the CW system components taking into account the permissible operating settings/ranges for each CW device of the CW system.

Referring to FIG. 1, there is shown a plurality of modules that form an energy analysis system 10 (hereinafter simply "system 10") for predicting and optimizing performance of various indoor and other components of a chilled water (CW) system pursuant to user or system Wet Bulb (WB) set point and load requirements. In general, it will be appreciated that every piece of equipment of a CW system reacts accordingly to achieve desired output conditions. The final balanced equipment state is dictated by the set points imposed on the individual pieces of equipment. The final balanced state will dictate the energy and/or water consumption for each piece of equipment within the said CW system.

By being able to quickly calculate not only performances of individual pieces of equipment but a total system balance for varying equipment interconnections, the system 10 can model any CW system configuration against any load input to determine the most cost effective set points of all pieces of equipment against a given ambient condition. The possible equipment being calculated could include, but is not limited to, computer/IT servers, CW units, water cooled chillers, cooling towers, air cooled chillers and pumps. Modeling all possible allowable set points for various CW components, for a given set of fixed conditions, allows global optimization of total cost not only for the current operating condition but also for anticipated future operating states of the system 10. This allows predictive manipulation of set points and equipment staging. It also may show if a non-local operating point might be possible. By "non-local" operating point it is meant to infer that scenarios not realized by small incremental changes to equipment set points or operating conditions can be calculated and examined to ensure that a more efficient CW system operating state is not being overlooked. As one example, incrementing set points by one degree lower or higher on certain CW loop equipment could yield higher total CW system energy consumption. In this scenario the control system would leave the set points as they are. However, in practice changing the same set points three to four degrees could actually trigger a different CW system operating mode that could utilize some form of economization that would have previously been overlooked. Actual equipment performance can also be fed back into the system 10 to adjust performance tables to make the theoretical equipment calculations even more accurate over time. Existing equipment data tables can then be extracted for use in the design of new systems providing more efficient CW system designs than what might be currently possible.

The system 10 can also evaluate equipment staging to optimize overall system performance. An example of equipment staging would be when the system 10 determines when it is more efficient to operate 3 chillers at ⅓ capacity each versus 2 chillers at ½ capacity each, since the efficiencies are not proportional. Using the system 10 to control pump staging is another example.

Referring further to FIG. 1, the system 10 may include a plurality of subsystem (software and hardware) modules for calculating the performance of each component of a CW system. For example, an "indoor unit calculator" module 12 may be used to calculate a performance for each indoor unit (i.e., component) of the CW system, for each allowable operating point for each of the indoor units of the CW system. A "primary CW pump" calculator module 14 may be used to model the performance of a primary CW pump at each allowable operating point. An "economizer calculator" module 16 may be used to model the performance of the heat exchanger economizer at every permissible operating point. A "cooling tower pump calculator" module 18 may be used to calculate the cooling tower pump performance at each allowable operating point for the cooling tower pump. A "cooling tower" calculator 20 is available to calculate the performance of the cooling tower of the CW system at each possible operating condition (i.e., considering temperature and rate of flow of water entering the cooling tower). A "chiller" calculator 22 is available to calculate the performance of a chiller unit of the CW system at each permissible operating point. A processing system 24 may be in communication with each of the components 12-22 and used to perform the optimizing and predictive calculations to meet the customer and/or system requirements at the prescribed WB. The WB set point and any other pertinent customer or system information 26 may be supplied to the processing system 26 as well as information about the load 28. It will be appreciated that by "permissible" or "possible" operating point or condition, it is meant that particular range of operating points or range of operating conditions that the component may be operated at (or within), and that this range may be constrained in part by the output of one component of the CW system which is being supplied as an input to another one of the components of the CW system.

Figure 2:
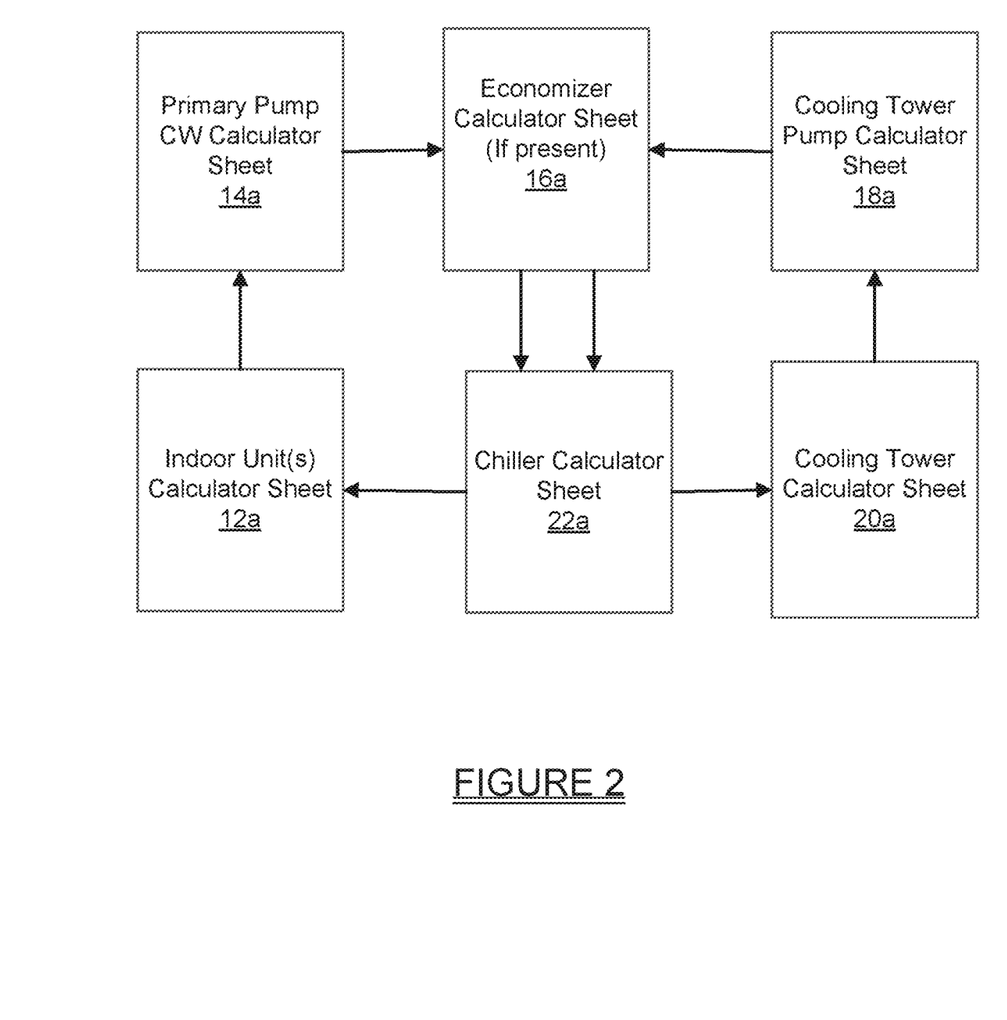
FIG. 2 is a high level block diagram of various calculation sheets that may be used by one embodiment of the system of the present disclosure to determine performance values for each component of a CW system, taking into account that the output from a first CW component that is being fed into a second CW component may affect the output of the second CW component.

Referring to FIG. 2, it can be seen that the system 10 may use a plurality of sources of information for its optimizing and predictive capabilities. It will be appreciated that the predictive and optimizing features that the system 10 enables one to implement may enable the user to realize significant energy (and thus cost) savings with little or no reduction in the capabilities of the equipment that is being managed by the system 10. The system 10 further enables anticipated loading schedules and/or anticipated future ambient conditions to be taken into account in controlling the diverse CW components that are thermally managing data center components in a given environment.

In particular, the indoor unit calculator module 12 may generate an indoor unit calculator data sheet 12a, the primary CW pump calculator module 14 may generate a primary CW pump calculator data sheet 14a, the economizer calculator module 16 may calculate an economizer calculator data sheet 16a, the cooling tower pump calculator module 18 may generate a cooling tower pump data sheet 18a, the cooling tower calculator module 20 may calculate a cooling tower data sheet 20a, and the chiller calculator module 22 may generate a chiller data sheet 22a. The data sheets 12a-22a each represent data or information on the performance of each of their associated components at every permissible operating point. However, if this information is available from a manufacture of a given component, then the system 10 may use the information provided from the component's manufacturer. The information provided from the data calculation sheets 12a-22a may be used by the system 10 in performing its optimizing and/or predictive calculation, and ultimately to "push" or override previously determined set points for the various components of the CW system to meet and/or maintain the WB set point and to meet load requirements.

Figure 3:
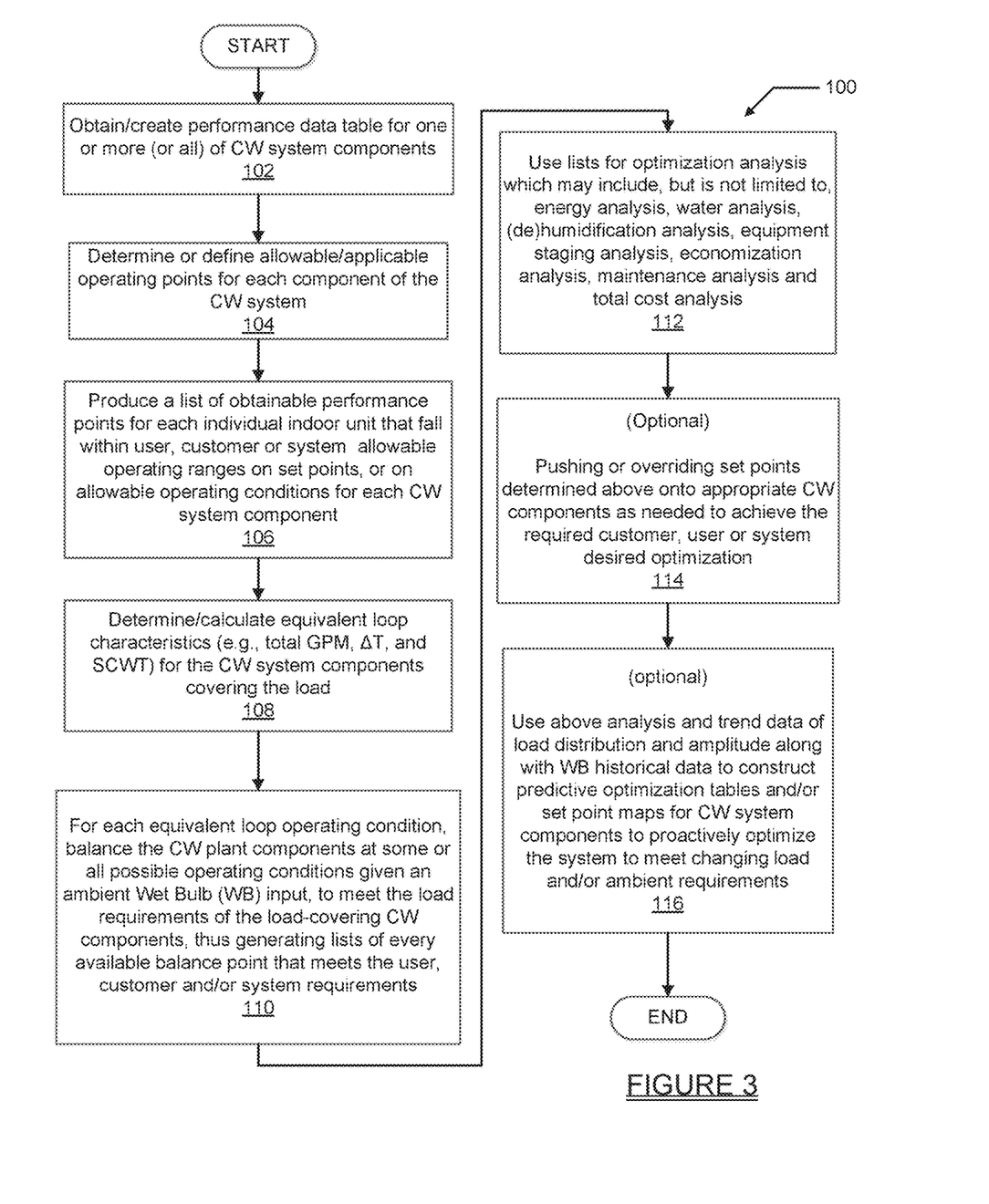
FIG. 3 is a high level flowchart setting forth major operations that may be performed by the system of the present disclosure in optimizing operation of the CW system to meet the load and/or customer specified requirements.

Referring now to FIG. 3, a high level flowchart 100 shows various operations that the system 10 of FIG. 1 may perform in its optimizing/control and/or predicting operations. At operation 102 the system 10 may obtain or create a performance data table (i.e., data sheet) for at least one component of the CW system. In practice, most or all of the components of the CW system will have data tables generated therefor, such as described in connection with FIG. 2. These data tables provide the performance information for all possible operating points of the component and preferably take into account constraints on each component that may be imposed if it is receiving, as an input, the output from a different one or combination of CW components.

At operation 104 the allowable or applicable operating points for each component of the CW system are defined. In this regard it will be appreciated that a defined range of operating points of a given component may in fact be narrower than what the component is actually able to operate at, depending on the constraints placed on the given component by other ones of the CW components or other factors. At operation 106 the system 10 produces a list of obtainable performance points for each individual indoor unit of the CW system that falls within user, customer and/or system allowable operating ranges on set points, or on allowable operating conditions for each CW system component. At operation 108 the system 10 determines/calculates the equivalent loop characteristics such as total gallons per minute (GPM) water flow, temperature differential and SCWT (supply chilled water temperature) for the CW system components covering the load.

At operation 110, for each equivalent loop operating condition, the system 10 balances the CW system components at some or all possible operating conditions given an ambient Wet Bulb (WB) input, to meet the load requirements of the load-covering CW components. This amounts to generating lists of every available balance point for the CW system that meets the user, customer and/or system requirements.

At operation 112 the lists generated at operation 110 may be used for optimization analysis. This may involve performing a wide variety of analyses which may include, but are not limited to, energy analysis, water analysis, humidification (or dehumidification) analysis, equipment staging analysis, economization analysis, maintenance analysis and total cost analysis for operating the CW system.

At operation 114, the system 10 may optionally operate to "push" or override previously implemented set points onto appropriate CW components as needed to achieve the required customer, user or system desired optimization. At operation 116, the system 10 may optionally use the above analysis/analyses performed at operation 112 along with trend data of a load distribution and amplitude, and also along with Wet Bulb historical data for a given environment, to construct predictive optimization tables and/or set point maps for CW system components to proactively optimize the system to meet changing load and/or ambient requirements.

Figure 4:
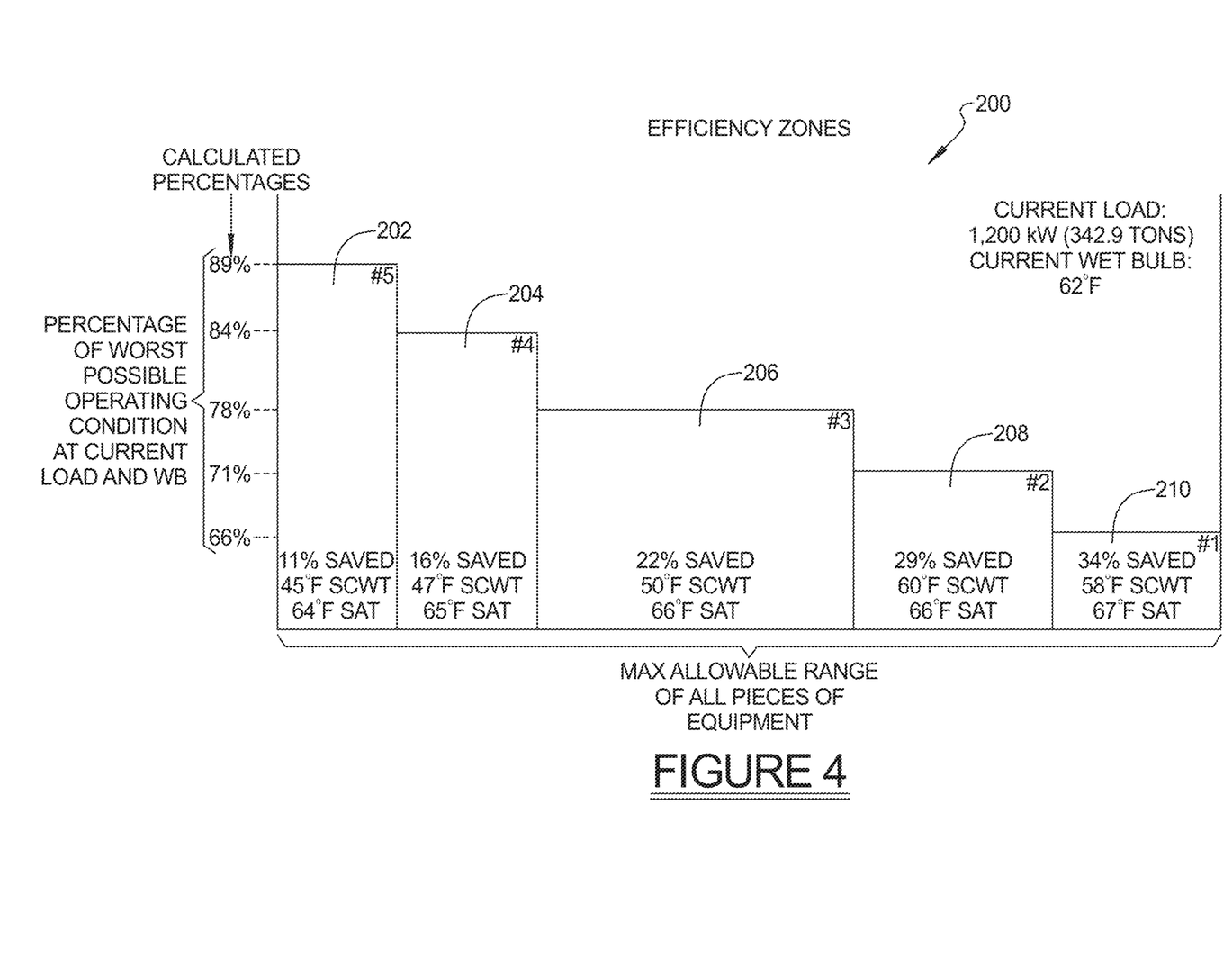
FIG. 4 is a graph illustrating how significant differences in efficiencies can be achieved depending on relatively small changes in supply chilled water temperature (SCWT) and supply/remote air temperature (SAT), at a given load and wet bulb (WB) temperature.

FIG. 4 shows a graph 200 to illustrate how significant differences in efficiencies can be achieved depending on relatively small changes in supply chilled water temperature (SCWT) and supply remote air temperature (SAT), while the current load and the wet bulb (WB) are held constant. For the purpose of the present disclosure, the term "SAT" will be understood to include supply and/or remote air temperature.

The graph 200 shows bars 202-210 which represent the percentage of energy savings (which is related to cost), relative to the worst possible operating condition at the current load and WB, that can be achieved with slight variations in the SCWT and the SAT. For example, block 210 indicates that an energy savings of about 34% can be achieved if the SCWT is set to 58° F. and the SAT is set to 67° F. At the opposite end of the graph 200, block 202 indicates that the energy savings achievable would only be 11% when the SCWT is set to 45° F. and the SAT is set to 64° F. The graph 200 thus shows the user what types of energy savings may be achievable, with different changes to both the SCWT and the SAT, against current operating conditions (i.e., in this example with the load at 1200 kW and WB at 62° F.). It will be appreciated that the system 10 provides a powerful tool for helping the user determine if/how small changes in the SCWT and SAT can be expected to impact the overall energy savings, relative to a baseline set of conditions (e.g., relative to the current load and WB temperature).

Figure 5:
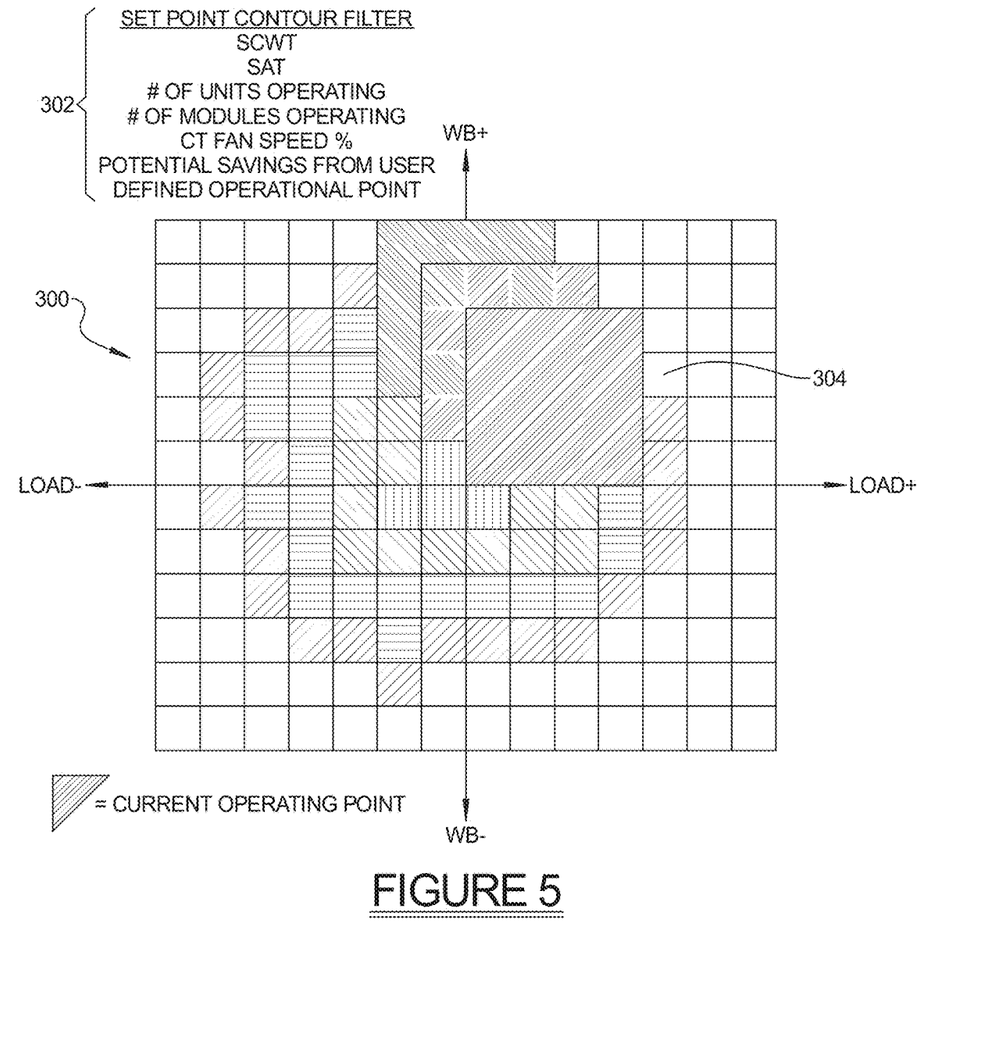
FIG. 5 is a chart that shows how the system can be used to predict, for a given load and WB temperature, what types of energy savings may be obtained depending on variables that the user has set.

FIG. 5 shows a chart 300 representing a specific property contour map that the system 10 may construct which helps to visually communicate (i.e, predict) how a user selected variable will change with respect to the WB and/or load changing. In discussing FIG. 5 it will be appreciated that the user will have entered a range of permissible set points (or possibly just one set point) into the system 10, for each of the CW components that the system 10 is monitoring and/or controlling. The user selectable range is not to exceed the equipment manufacturer's specific equipment limitations. The user will have also specified specific set points or ranges of set points for the variables indicated by 302. These selected set points might include a range of SCWT temperatures that are permissible, a range of SAT that the user sets as permissible, etc.

Figure 6:
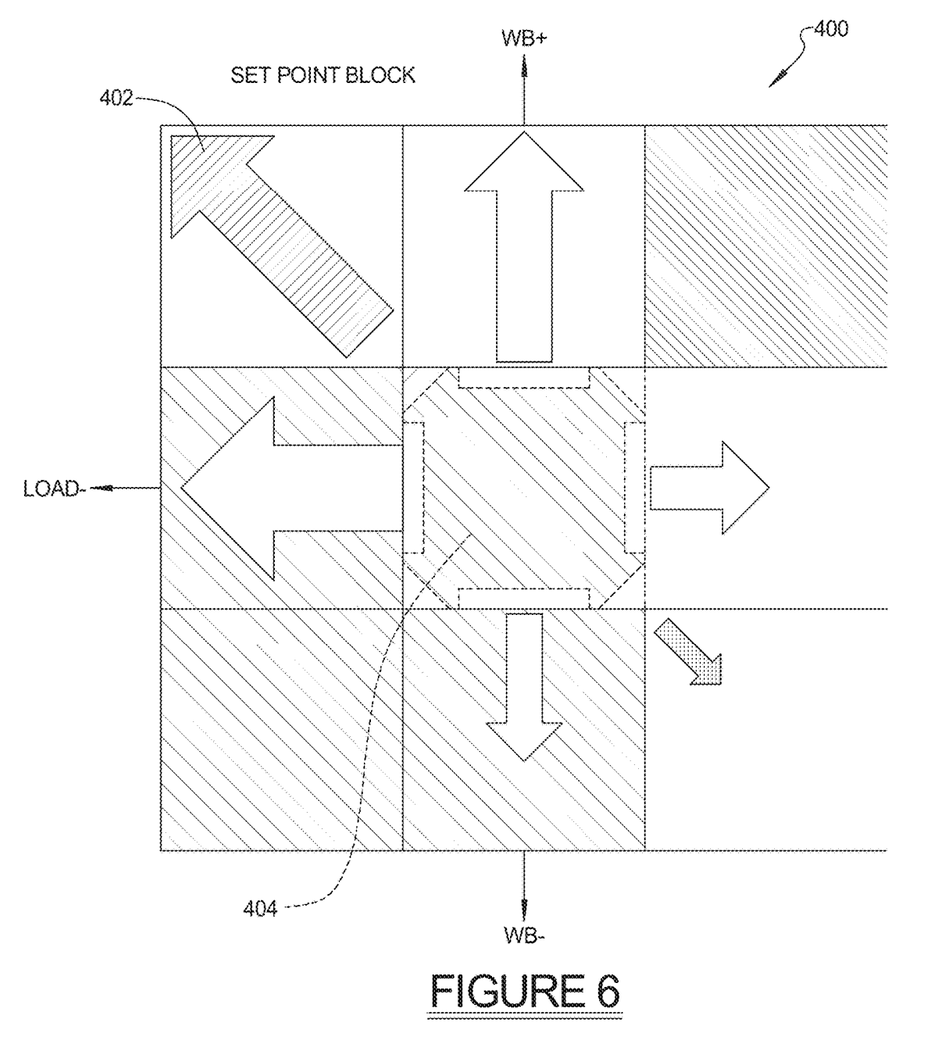
FIG. 6 is graph that may be presented to the user that shows the user the direction that the system is predicting the load and the WB temperature to take based on some preselected form of historical operating data (e.g., time of day or external information source)

The chart 300 of FIG. 5 may enable the system to visually represent a changing user selected variable of interest. The variable could be but is not limited to the total CW system energy consumption, types of energy savings compared to a baseline, SCWT, SAT set points, number of chillers operating, number of indoor units operating, etc. Every box in FIG. 5 may be selectable by the user (such as by clicking on with a mouse or touching with a finger) to pull up additional charts or graphs, such as shown in FIG. 4, so that the user may compare different operating equipment scenarios to confirm the impact of their said imposed equipment operating range limitations. For example, if the user selects box 304 in FIG. 5, then a graph such as FIG. 4 may be provided that compares total energy consumption of multiple scenarios with each scenario operating at that specific load/WB temperature the user has selected. The scenarios shown may communicate the effect on total CW system energy consumption if different specific equipment set points and the specific variables 302 that the user has selected were to be implemented. FIG. 6 illustrates a graph 400 that may be presented to the user that shows the user the direction that the system 10 is predicting the load and the WB temperature to take based on historical operating data. For example, the system 10 may use historical data such as the load experienced during specific times of day, along with WB temperatures experienced at various times of day, to predict where the load and WB temperature is trending. In the example of FIG. 6, the arrow 402, being the largest of the six arrows shown, indicates that the trend at the present time (represented by box 404) is predicted by the system 10 to be toward an increasing WB temperature and a decreasing load. The color of the boxes or arrows to visually communicate a user specified system property. In example only, green arrows could indicate the system would be moving to a more energy efficient or equipment friendly mode of operation. Understanding likelihood of system conditions to change to pre-determined values is important when understanding priority in possible operating condition calculations.

Figure 7A:
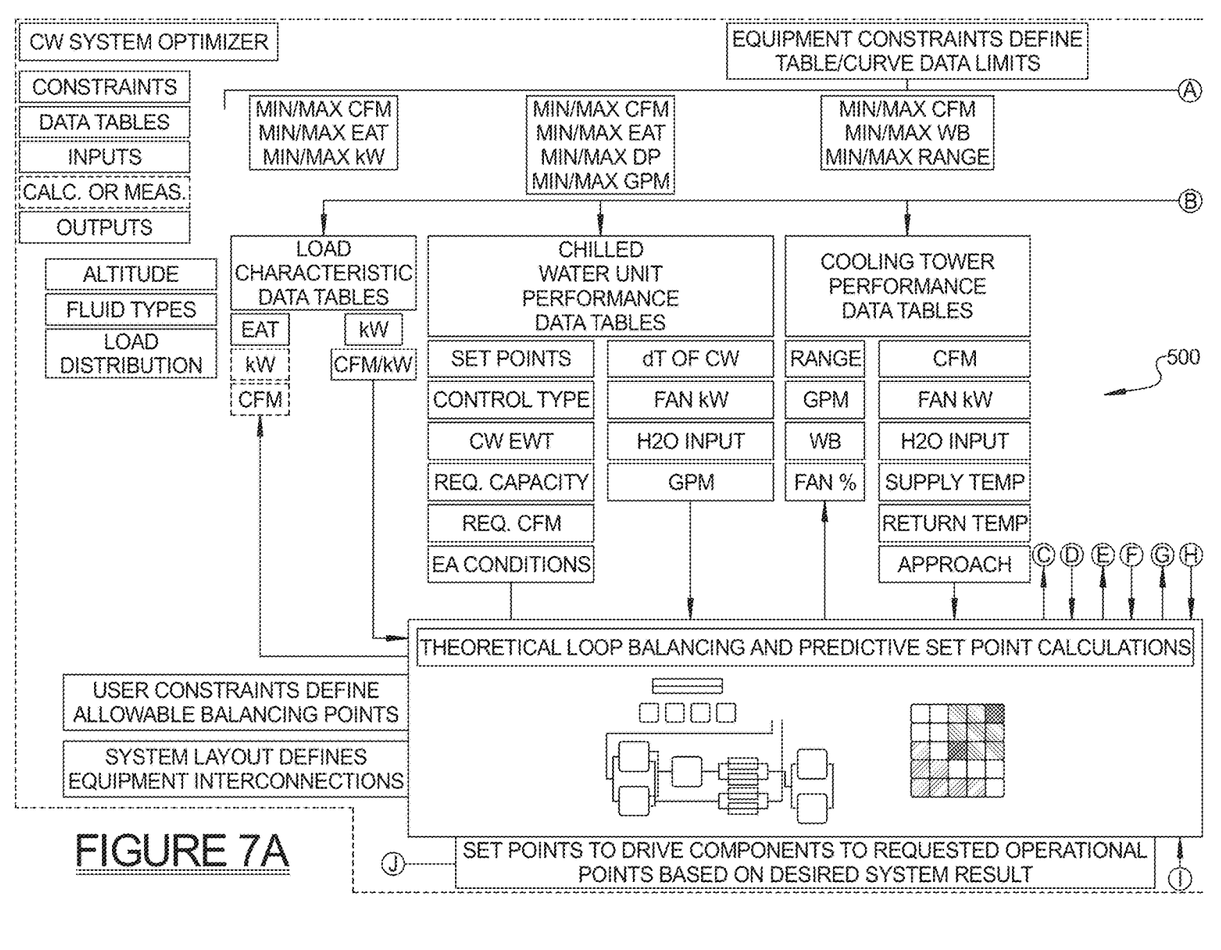
FIGS. 7A-7B is a diagram 500 showing how variables for the load and the various components making up a CW system may be taken into account by the system 10 in determining balancing points for every possible permissible equipment configuration for the CW system.
Figure 7B:
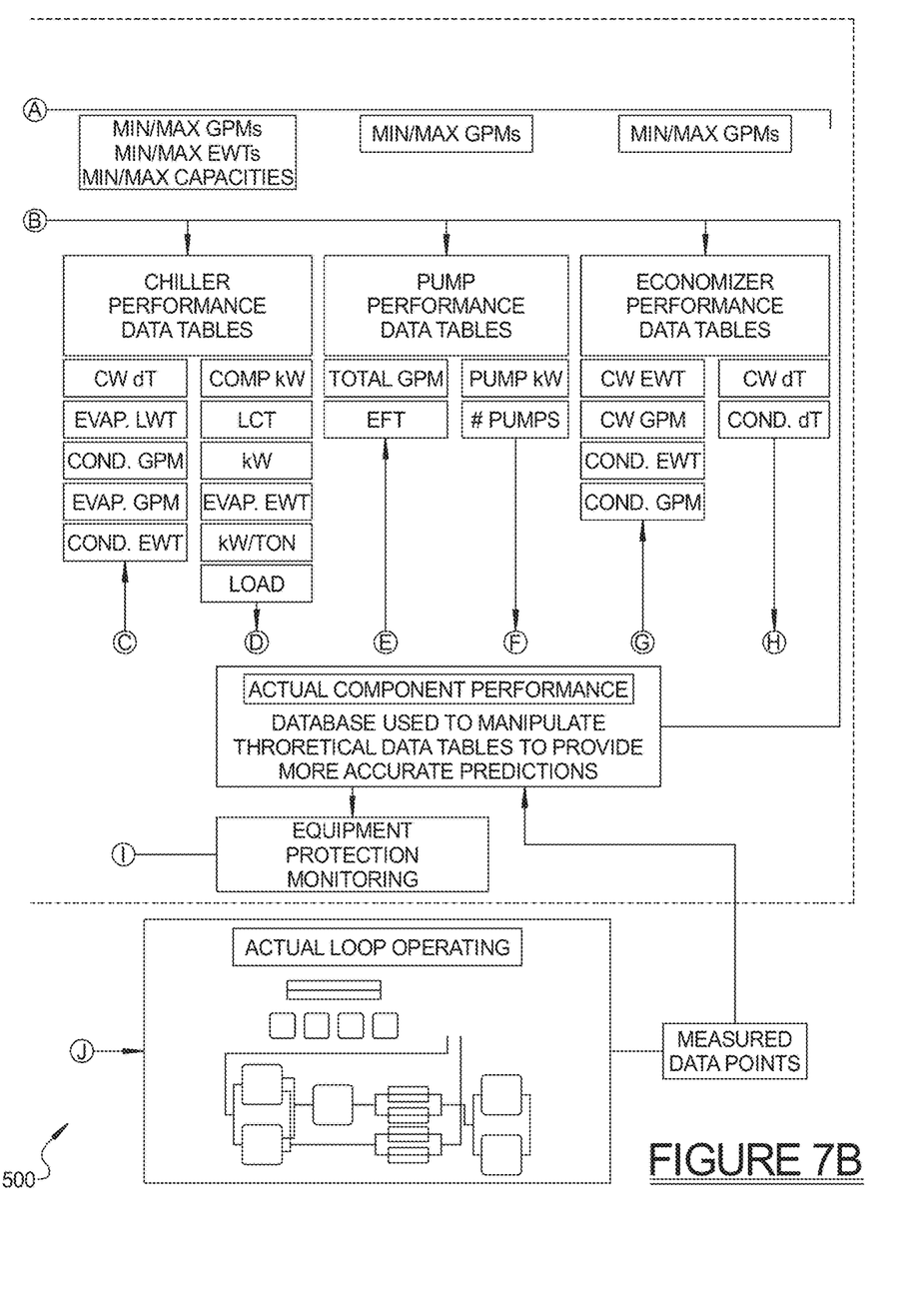

FIGS. 7A-7B illustrates a diagram 500 showing how variables for the load and the various components making up a CW system may be taken into account by the system 10 in determining balancing points for every possible permissible equipment configuration for the CW system. FIGS. 7A-7B further illustrates how the actual component performance is used in closed loop fashion, via line 502, to update the various performance data tables based on actual measured data points. The theoretical system is calculated to balance within allowable user/equipment defined boundaries. Using user input to determine desired optimization, a specific CW system balance result is examined and the appropriate equipment set points are then communicated to the respective pieces of equipment so as to allow the individual pieces of equipment to react in a similar fashion as to the theoretical model (desired balance). Inconsistencies between performances of actual individual pieces of equipment and theoretical performances are resolved by adjustment to the equipment data tables. System shall monitor for alarming conditions and protect equipment by disallowing concerning set point communication. By adjusting theoretical data tables, system accuracy in theoretical balancing shall become more accurate over time.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for analyzing performance of a chilled water (CW) system having a plurality of CW components, the method comprising:
    using a processor to analyze a collection of at least one of allowable operating points, allowable operating ranges or allowable operating conditions, for each one of the plurality of CW components of the CW system;
    generating an electrical signal representative of at least one of a user set or system measured ambient wet bulb (WB) temperature for an environment in which at least a subplurality of the CW components are located;
    using the processor to read the electrical signal and to analyze at least one of the user set or system measured ambient wet bulb (WB) temperature for the environment;
    using the processor to calculate equivalent loop conditions for each of the CW components covering a load being thermally managed by the CW system, the equivalent loop conditions relating to a selected performance parameter for at least a subplurality of the CW components covering the load in a manner to manage cooling of the load; and
    for each one of the calculated equivalent loop conditions, using the processor to generate information for balancing the CW components by selecting specific operating points of the CW system, given the user set or system measured WB temperature, to meet load requirements imposed by the load;
    further comprising using the processor to analyze data from performance data tables for each one of the CW components of the CW system, the performance data tables defining at least one of operating points or operating ranges for each of the CW components based on at least one of an input or an output associated with each of the CW components, and from the performance data tables using the processor to collect the at least one of allowable operating points, allowable operating ranges or allowable operating conditions; and
    wherein the operation of using the processor to generate information for balancing the CW components comprises using the processor to analyze the data and to generate a plurality of lists which include set points for each of the CW components, for every available balance point of the CW system that enables the CW system to meet the load requirements given the user set or system measured WB temperature; and using the processor to evaluate the plurality of lists and set points for each of the CW components and to control adjustment of one or more of the CW components to optimize operation of the CW system.

2. The method of claim 1, further comprising using the information to optimize operation of the CW components by selecting specific set points for the CW components that result in optimizing a selected operational parameter for the CW system.

3. The method of claim 1, wherein the operation of obtaining a collection comprises obtaining a collection of at least one of allowable operating points, operating ranges or allowable operating conditions, for each one of the subplurality of components of the CW system, based on information at least one:
provided by the user; or
representing a known operating parameter limitation.

4. The method of claim 1, wherein the performance parameter comprises a gallons per minute (GPM) flow of water provided by the CW system.

5. The method of claim 1, wherein the performance parameter comprises a change in temperature of the water able to be affected by the CW system.

6. The method of claim 1, wherein the performance parameter comprises a supply chilled water temperature (SWCT) of water being output by one of the CW components of the CW system.

7. The method of claim 1, wherein the set point of the each of the CW components further relates to load requirements imposed by the load.

8. The method of claim 1, wherein the selected performance parameter relates to at least one of:
electrical power consumed by the CW system;
water used by the CW system requiring replenishment;
dehumidification analysis;
equipment staging analysis;
maintenance of one or more of the CW components; and
total cost of operation of the CW system.

9. A method for analyzing and optimizing performance of a chilled water (CW) system having a plurality of CW components, the method comprising:
using a processor to analyze a performance data table for each one of the CW components of the CW system, the performance data table defining at least one of operating points or operating ranges for each of the CW components based on at least one of an input or an output associated with each of the CW components;
generating an electrical signal representative of at least one of a user set or system measured ambient wet bulb (WB) temperature for an environment in which at least a subplurality of the CW components are located;
using the processor to analyze the user set or system measured ambient wet bulb (WB) temperature for the environment;
using the processor to analyze a collection of at least one of allowable operating points, operating ranges or allowable operating conditions, for each one of the subplurality of components of the CW system, based on information:
provided by the user; or
representing a known operating parameter limitation;
using the processor to calculate equivalent loop conditions for each of the CW components covering a load being thermally managed by the CW system, the equivalent loop conditions relating to at least one of gallons per minute (GPM), a change in temperature, and a supply chilled water temperature (SWCT) for at least a subplurality of the CW components covering the load in a manner to manage cooling of the load;
for each one of the calculated equivalent loop conditions, using the processor to analyze and balance the CW components of the CW system, given the user set or system measured WB temperature, to meet load requirements imposed by the load, to thus generate a plurality of lists which include a set point of each of the CW components, for every available balance point of the CW system, that meets the user set or system measured WB temperature and load requirements imposed by the load; and
using the processor to consider the plurality of lists and to optimize operation of the CW components by selecting specific set points for the CW components that result in optimizing a selected operational parameter for the CW system, and at least one of limiting or controlling operation of the CW components in accordance with the selected specific set points.

10. The method of claim 9, further comprising using trend data of a load distribution affecting the load affecting operation of the CW components to construct at least one of predictive optimization tables or predictive set point maps for CW system components to proactively optimize the CW system to meet changing load conditions affecting the CW system.

11. The method of claim 9, further comprising using trend data associated with a distribution and amplitude of the load to construct at least one of predictive optimization tables or predictive set point maps for the components of the CW system to meet at least one of changing load conditions or ambient temperature requirements.

12. The method of claim 11, further comprising using historical WB temperature data to construct the at least one of predictive optimization tables or set point maps.

13. The method of claim 9, wherein the selected operational parameter relates to at least one of:
electrical power consumed by the CW system;
water used by the CW system requiring replenishment;
dehumidification analysis;
equipment staging analysis;
maintenance of one or more of the CW components; and
total cost of operation of the CW system.

14. The method of claim 9, further comprising overriding a previously selected one of the selected set points for one of the CW components to cause the CW system to maintain optimization of the selected operational parameter.

15. A system for analyzing performance of a chilled water (CW) system having a plurality of CW components, the system comprising:
a subsystem to generate an electrical signal representative of at least one of a user set or system measured ambient wet bulb (WB) temperature for an environment in which at least a subplurality of the CW components are located;
at least one processor having non-transitory, machine executable code configured to:
read the electrical signal from the subsystem;
make use of a performance data table for each one of the CW components of the CW system, the performance data table defining at least one of operating points or operating ranges for each of the CW components based on at least one of an input or an output associated with each of the CW components;

make use of the electrical signal representing the at least one of a user set or system measured ambient wet bulb (WB) temperature for the environment;

make use of a collection of at least one of allowable operating points, operating ranges or allowable operating conditions, for each one of the subplurality of components of the CW system;

calculate equivalent loop conditions for each of the CW components covering a load being thermally managed by the CW system, the equivalent loop conditions relating to a performance parameter for one or more of the CW components covering the load in a manner to manage cooling of the load; and for each one of the calculated equivalent loop conditions, generating information relating to a plurality of lists that include a set point of each of the CW components, for every available balance point, for balancing the CW components of the CW system, given the at least one of user set or system balanced WB temperature, to meet load requirements imposed by the load; and wherein the processor is further configured to use the information to control at least a subplurality of the CW components by adjusting the subplurality of CW components to conform to at least one of a specific operating point or a specific operating range, to optimize operation of the CW system.

16. The system of claim 15, wherein the using a collection comprises using a collection of at least one of allowable operating points, operating ranges or allowable operating conditions, for each one of the subplurality of components of the CW system, based on information at least one:

provided by the user; or representing a known operating parameter limitation.

* * * * *